Figure 1:
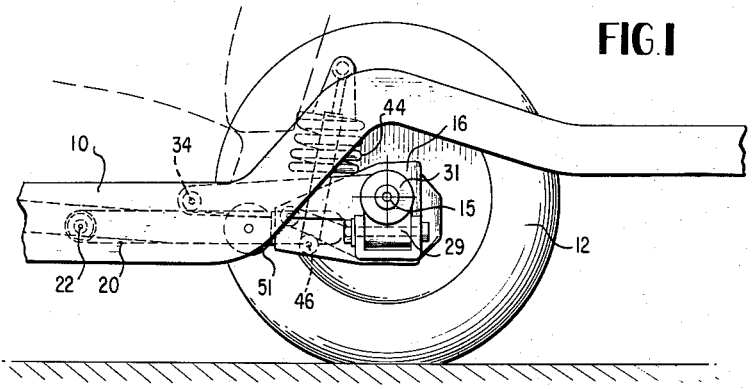

April 12, 1966    J. MÜLLER ETAL    3,245,491
WHEEL SUSPENSION
Filed Jan. 27, 1964    2 Sheets-Sheet 1

INVENTORS
JOSEF MÜLLER
ALF JOHN MÜLLER
BY
*Dicke & Craig*
ATTORNEYS

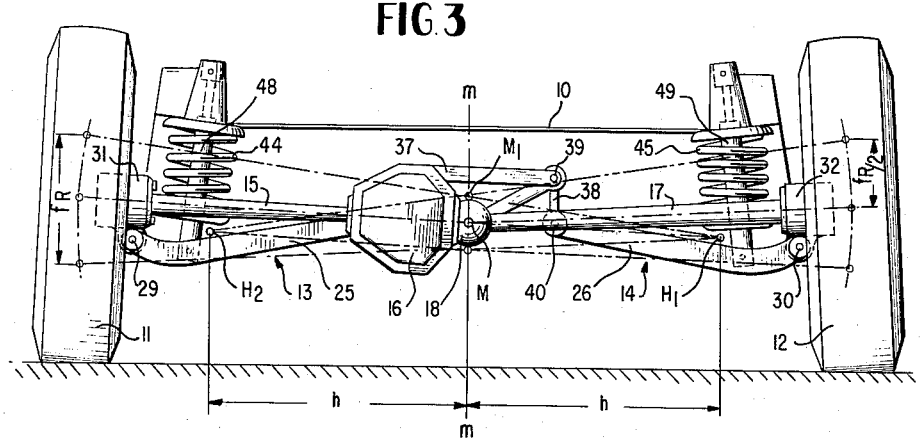
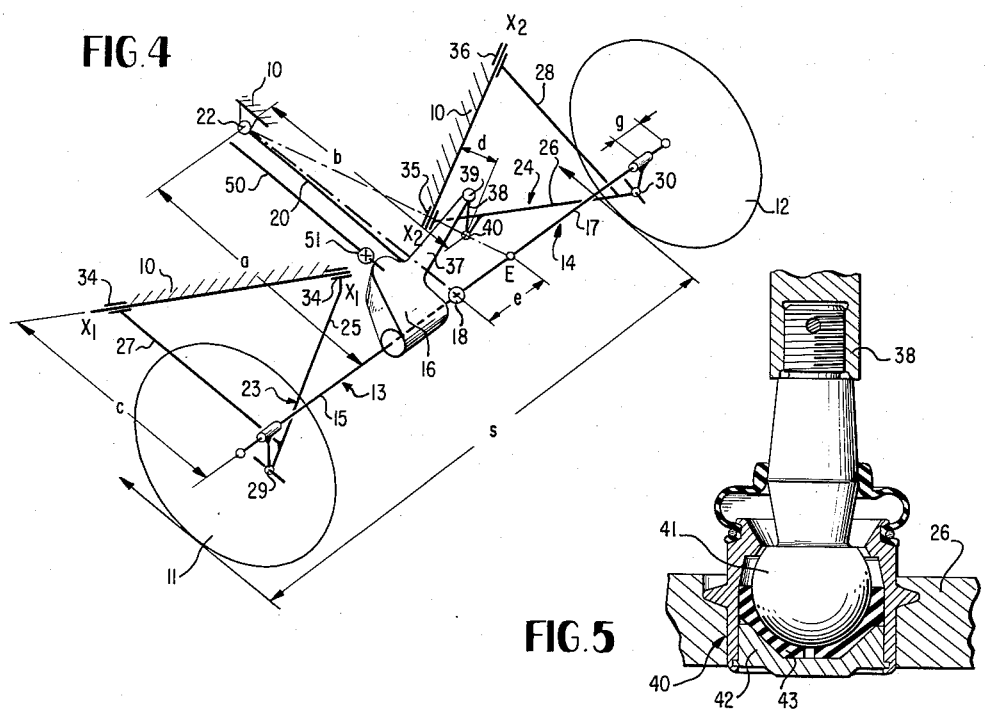
INVENTORS
JOSEF MÜLLER
ALF JOHN MÜLLER
BY
*Dicke & Craig*
ATTORNEYS

United States Patent Office 3,245,491
Patented Apr. 12, 1966

3,245,491
WHEEL SUSPENSION
Josef Müller, Stuttgart-Riedenberg, and Alf John Müller, Stuttgart-Bad Cannstatt, Germany, assignors to Daimler-Benz Aktiengesellschaft, Stuttgart, Germany
Filed Jan. 27, 1964, Ser. No. 340,385
Claims priority, application Germany, Jan. 31, 1963, D 40,797
19 Claims. (Cl. 180—73)

The present invention relates to an independent wheel suspension, and more particularly to a swinging half-axle suspension arrangement for motor vehicles.

The co-pending application Serial No. 69,373, filed November 15, 1960, relates to a swinging half-axle arrangement for vehicles, especially motor vehicles, in which the geometric point of rotation of one swinging half-axle is disposed on the vertical transverse plane of the vehicle extending through the wheel centers and on the opposite side of the vertical longitudinal center plane of the vehicle, whereas the other swinging half-axle is pivotally connected within the area of this center longitudinal plane at the first-mentioned swinging half-axle. By such an arrangement is achieved above all that not only the swinging half-axle extended beyond the vertical center longitudinal plane but also the swinging half-axle pivotally connected thereto has a virtual point of rotation which, as viewed from the associated wheel, is also disposed beyond or on the opposite side of the vertical center longitudinal plane of the vehicle.

This extension or elongation of the swinging half-axle is, however, valid only if both wheels simultaneously carry out unidirectional strokes, i.e., strokes in the same direction, whereas with one-sided or unilateral strokes of the swinging half-axle pivotally connected to the other half-axle, the swinging length thereof corresponds only to the length of this half-axle from the point of pivotal connection thereof to the wheel.

The present invention, in contradistinction thereto, aims above all at a construction which effects a further increase or extension of the swinging length of both swinging half-axles by corresponding supports and connections thereof at the vehicle superstructure and with one another, and essentially consists in that the support of the swinging half-axle which is supported on the opposite side of the vertical vehicle longitudinal center plane, is provided on a jointed linkage or pivotally connected guide rods connecting the other swinging half-axle with the vehicle superstructure in such a manner that the support point of the first-mentioned swinging half-axle participates in part in the stroke movements of the second-mentioned swinging half-axle.

Preferably the swinging half-axles are thereby supported at the vehicle superstructure by means of thrust guide members, especially inclined guide arms, pivotally connected with the swinging half-axles, whereby one of the two thrust members or guide arms simultaneously forms the jointed linkage on which is supported the oppositely disposed swinging half-axle.

In a particularly preferred embodiment of the present invention the two swinging half-axles are directly connected with one another within the area of the vertical longitudinal center plane of the vehicle by means of a joint in the manner of a single-joint swinging half-axle, and further the swinging half-axle supported on the opposite side of the aforementioned vehicle longitudinal center plane is pivotally supported at the vehicle superstructure by means of a longitudinally directed arm in a point arranged within the area of the aforementioned longitudinal center plane about a vehicle transverse axis and is supported by means of a transversely directed arm on the aforementioned jointed linkage, especially on an inclined guide member.

By such an arrangement, on the one hand, the advantages described in the aforementioned co-pending application are achieved and maintained: especially reduced changes in camber and therewith smaller changes in wheel track, lower instantaneous center during simultaneous spring action, smaller gyroscopic effect during spring deflections, possibility of a 100 percent brake nodding or nose-dive compensation, more simple construction of the axle drive shaft by dispensing with separate sliding bearings, avoidance of the tilting or canting of the wheel bearing and therewith of a rumbling of the axle by reason of a bearing support possibility more favorable against bending of the shaft, reduction in cost in the manufacture of the axle unit and reduction of the maximum buckling or bending angle in the cardan joints of the axle drive shafts as well as less space requirement for the wheel casings and therewith a possibility of a wider luggage space.

On the other hand, in addition to the aforementioned advantages, the following advantages may be obtained by the present invention:

(1) The kinematics of movement of the two swinging half-axles can, insofar as the two swinging half-axles are pivotally connected with one another in the vertical longitudinal center plane, be constructed and constituted symmetrically both with unidirectional as well as alternate spring actions so that the same camber angle and/or the same change in camber as well as the same change in wheel track result for both the left and right wheel.

(2) Already a relatively small extension or elongation of the one swinging half-axle beyond the vertical center longitudinal plane of the vehicle results in a significant effective increase of the swinging length so that possibly the points of rotation of the swinging half-axles may be disposed without difficulty in proximity to the oppositely disposed wheel.

(3) The noise insulation between axle unit and vehicle superstructure can be additionally improved by the interposition of rubber elements in the supporting jointed linkage.

(4) Insofar as the support of the swinging half-axle, which is supported directly at the vehicle superstructure, is provided by means of a forwardly directed longitudinally extending support arm, the starting moments may be absorbed in a particularly advantageous manner, possibly also in such a manner that the undesired acceleration pitching or nodding movements can be prevented by 100 percent or also in excess of 100 percent, that is, in such a manner that the vehicle superstructure or body is urged or pressed upwardly instead of downwardly by the accelerating forces.

(5) Since with unidirectional spring movements the swinging half-axles swing with a larger swinging length than with alternate spring movements, with which the common swinging axis of both swinging half-axles is disposed in the vertical longitudinal center plane of the vehicle, the alternate spring action is softer than the unidirectional spring action, whereby the spring softness increases with the degree of the transmission of the spring path between the wheel and the spring means. As a result thereof, there exists the possibility to dispense with a separate equalization spring without imparting to the vehicle a tendency to oversteer.

In a simple and preferred construction according to the present invention, the half-axles are formed essentially by the axle shafts driving the wheels which are connected with one another within the area of the vertical vehicle longitudinal center plane by a driving joint. The axle gear housing thereby forms preferably a part of the swinging half-axle supported beyond or on the opposite side of the vehicle longitudinal center plane in that it can support at the vehicle superstructure as well as the transversely directed arm for the support at the jointed linkage.

Accordingly, it is an object of the present invention to provide an independent wheel suspension, especially for driven wheels of a motor vehicle which eliminates the aforementioned shortcomings and drawbacks encountered with the prior art constructions.

Another object of the present invention resides in the provision of a swinging half-axle suspension for vehicles in which an effective increase in the swinging length of both swinging half-axles is achieved irrespective of the type of spring deflections.

Another object of the present invention resides in the provision of a swinging half-axle wheel suspension of the type described hereinabove in which the supporting point of the one swinging half-axle partly participates in the stroke movements of the second swinging half-axle.

Still another object of the present invention resides in the provision of an independent wheel suspension, especially a swinging half-axle wheel suspension for motor vehicles which results in a reduction in the change in camber angle and therewith a reduction in the wheel track changes during spring movements of the wheels.

Another object of the present invention resides in the provision of an independent wheel suspension utilizing swinging half-axles which produces a lower instantaneous center during simultaneous spring movements of both wheels, smaller gyroscopic effects during spring deflections as well as a more simple construction of the axle drive shaft by the elimination of special bearings, especially sliding bearings.

A still further object of the present invention resides in the provision of an independent wheel suspension for the driven wheels of a motor vehicle, especially by means of swinging half-axles, which permits the possibility of a complete nose-diving equalization, elimination of the tilting of the wheel bearings as well as decrease in the maximum bending angle that occurs within the cardan joint of the axle drive shafts.

A further object of the present invention resides in the provision of a swinging half-axle wheel suspension fulfilling the advantages and objects mentioned above while simultaneously permitting a reduction in the manufacturing cost, particularly as regards the axle unit and a reduction in the space requirements for the wheel casings and therewith the possibility of a larger luggage space.

Still another object of the present invention resides in the provision of a wheel suspension utilizing swinging half-axles which produces substantially the same camber angle or changes in camber angle and changes in wheel track regardless of the type of spring deflections of the wheels.

Another object of the present invention resides in the provision of a swinging half-axle wheel suspension for a motor vehicle in which a significant increase in the length of the effective swinging half-axle is obtained even with relatively small extensions of only one swinging half-axle beyond the vertical longitudinal center plane of the vehicle.

Still another object of the present invention resides in the provision of a wheel suspension which permits an improved noise insulation between the axle unit and the body and in which the starting or accelerating pitching movements may be absorbed in a particularly advantageous manner, possibly to such an extent that an overcompensation results.

A further object of the present invention resides in the provision of a swinging half-axle wheel suspension in which the effective spring system is softer with alternate or oppositely directed spring movements than with unidirectional spring movements of the vehicle, thereby offering the possibility to eliminate a separate equalization spring without any oversteering tendency on the part of the vehicle.

Figure 2:
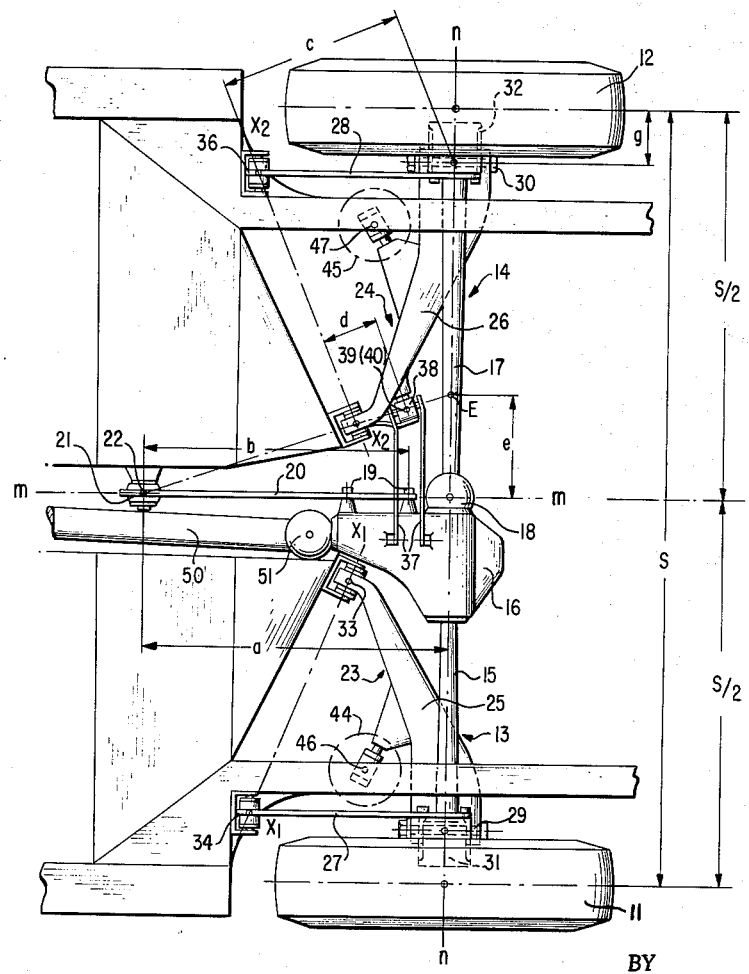

These and other objects, features and advantages of the present invention will become more obvious from the following description when taken in connection with the accompanying drawing which shows, for purposes of illustration only, two embodiments in accordance with the present invention, and wherein:

FIGURE 1 is a partial side elevational view of an axle arrangement in accordance with the present invention, FIGURE 2 is a plan view on the axle arrangement of FIGURE 1, FIGURE 3 is a rear elevational view of the axle arrangement of FIGURES 1 and 2, FIGURE 4 is a perspective schematic view of a modified embodiment of an axle arrangement in accordance with the present invention, and FIGURE 5 is a partial cross-sectional view, on an enlarged scale, through one embodiment of a joint for the support of the one swinging half-axle on the other swinging half-axle.

Referring now to the drawing wherein like reference numerals are used throughout the various views to designate like parts, the two rear wheels 11 and 12 are suspended at the vehicle superstructure, for example, at the frame combined or formed unitary with the vehicle body by means of the axle arrangement to be described more fully hereinafter. The wheels 11 and 12 are for that purpose supported on the two swinging half-axles generally designated by reference numerals 13 and 14 in such a manner that they pivot or swing in the upward and downward directions together with these swinging half-axles. The left swinging half-axle 13 is constituted by the axle drive shaft 15 and the axle gear housing 16 in which the axle drive shaft 15 is supported without a joint so that the axle gear housing 16, the axle drive shaft 15 and the rear wheel 11 form a swinging unit. The other right swinging half-axle 14 is constituted essentially by the second axle drive shaft 17 with which the wheel 12 is rigidly connected. Both swinging half-axles 13 and 14 are connected with one another by a cardan joint 18 which is disposed in the vertical longitudinal center plane $m—m$ of the vehicle. A forwardly longitudinally directed support arm 20, preferably constructed as a leaf-spring, is secured at the swinging half-axle 13 or at the axle gear housing 16 forming a part thereof by means of bolts 19. The support arm 20 is connected at the vehicle superstructure 10 by the interposition of rubber cushions 21 by means of the joint 22 in such a manner that the swinging half-axle 13 is able to swing or pivot about a vehicle transverse axis extending through the joint 22.

For the further guidance and support of the swinging half-axles 13 and 14 in the longitudinal direction of the vehicle, a thrust arm or inclined guide member generally designated by reference numerals 23 and 24, respectively, is provided for a corresponding one of the swinging half-axles. These thrust or inclined guide structures 23 and 24 each consists of a rigid arm 25 or 26 which, as viewed from the respective wheel, is directed obliquely forwardly with respect to the vertical longitudinal vehicle center plane and of a leaf-spring-like arm 27 or 28 arranged in the driving direction, which is connected in an angle-stiff manner with the rigid arm 25 or 26 (FIGURE 4) or with the bearing housing 31 or 32 (FIGURES 1 to 3) for the respective wheel connected, respectively, with the rigid arm 25 or 26 by means of a joint 29 or 30, preferably by the interposition of rubber cushions or the like. The two arms of each inclined guide member 23 or 24 are supported in rubber joints 33 and 34 or 35 and 36 at the vehicle superstructure 10 and more particularly in such a manner that the joints 33 and 34 of the left inclined guide member 23 determine a swinging axis $x_1—x_1$ and the joints 35 and 36 of the right inclined guide member 24 a swinging axis $x_2—x_2$.

A transversely directed arm 37 consisting, for example, of sheet metal or struts, which may be constructed, for example, elastically with respect to bending and torsion, as apparent from FIGURE 2, is further connected with the axle gear housing 16; the swinging half axle 13 is extended beyond the vertical longitudinal center plane $m$—$m$ by means of the transversely directed arm 37. This bracket-like arm 37, which operates somewhat like a pair of leaf springs, serves for the mutual support of the two swinging half-axles 13 and 14 with respect to one another by the interposition of a pivotal link means or intermediate guide member 38 which is pivotally connected at the upper end thereof by a joint 39 with the transversely directed support arm 37 and with the lower end thereof by means of a joint 40 with the inclined guide member 24 of the other swinging half-axle 14. The joints 39 and 40 are preferably constructed as rubber joints in that, for example, as shown in FIGURE 5 for the joint 40, the ball member 41 carried by a pin rigidly connected with the intermediate guide member 38 is supported by the interposition of rubber cushions 43 within the joint socket 42 connected, for instance, rigidly connected with the arm 26 of the inclined guide member 24.

Coil springs 44 and 45 serve for the spring support of the wheels 11 and 12 which are operatively connected at the lower ends thereof by means of joints 46 and 47 at the arms 25 and 26 of the inclined guide members 23 and 24 and which are supported at the upper ends thereof against the vehicle superstructure 10 in any known manner. Shock absorbers 48 and 49 may be arranged within the coil springs 44 and 45 in a conventional manner.

The drive of the wheels takes place by an engine arranged, for example, forwardly in the vehicle by way of a change-speed transmission (not shown) and a cardan shaft 50 which is operatively connected with the drive shaft of the axle gear by a cardan joint 51.

*Operation*

The operation of the axle arrangement in accordance with the present invention is as follows:

If both wheels 11 and 12 are spring-deflected or undergo spring movements in opposite directions, for example, the wheel 11 is spring-deflected upwardly and the wheel 12 is spring-deflected downwardly by an equal amount or stroke, then the entire axle unit swings as a unit about the longitudinal axis extending through the joints 22 and 18 in the vertical longitudinal center plane $m$—$m$ of the vehicle, whereby the wheel 11 together with the swinging half-axle 13 carries out a swinging movement about the axis $x_1$—$x_1$ by means of the inclined guide member 23 while the wheel 12 together with the swinging half-axle 14 carries out simultaneously a swinging movement about the axis $x_2$—$x_2$ by means of the inclined guide member 24 which is permitted without difficulty by the cardan joint 18 connecting the two half-axles with each other. Prerequisite, however, is that the support of the swinging half-axle 13 on the inclined guide member 24 of the other swinging half-axle 14, that is, the intermediate guide member 38 together with the joints 39 and 40 moves downwardly by an equal stroke in relation to the upwardly spring deflected swinging half-axle 13, whereby this support, that is, the intermediate guide member 38 in fact also carries out such stroke in relation to the downwardly spring deflected swinging half-axle 14.

If only one of the two wheels is spring deflected, for example, only the wheel 11, and the other wheel, for example, the wheel 12 is assumed to remain at first in the same pre-existing spring position, then the swinging half-axle 13 seeks to swing about an axis extending through the joints 22 and 40 which intersects the vertical transverse plane $n$—$n$ extending through the wheel centers at the point E at a distance $e$ from the vertical longitudinal center plane $m$—$m$. Since, however, the center point M of the cardan joint 18 (FIG. 3) is at the same time raised, a lifting or raising of the support or intermediate guide member 38 also takes place by way of the swinging half-axle 14, whereby the (virtual) point of rotation of the swinging half-axle 13 moves further toward the right. A similar operation also results with a corresponding unilateral stroke movement of the wheel 12 since, as a result of the upward movement of the center point M of the cardan joint 18 by the intermediate guide member 38, the (virtual) point of rotation of the swinging half-axle 14 moves from point M toward the left. The arrangement can thereby be made in such a manner that the points of rotation of the two swinging half-axles have the same distance from the vertical longitudinal center plane $m$—$m$.

If both wheels 11 and 12 are spring-deflected in the upward direction by the same amount, for example, by the stroke $f_R/2$ in relation to the vehicle superstructure 10, then the following takes place: the left swinging half-axle 13 again seeks to swing about the axis 22–40, that is, in the wheel center transverse plane $n$—$n$ with the swinging length $$\frac{s}{2}+e$$

where $s$ is the wheel track of the wheels. The center point M of the cardan joint 18 is thereby lifted which is simultaneously also the center point of the joint of the right swinging half-axle 14. Since, however, the right wheel 12 is also lifted or raised simultaneously by the stroke $f_R/2$, the center point of the joint and therewith also the axle gear 16 and the cardan joint 18 are lifted by the right inclined guide member 24 by way of the support or intermediate guide member 38 so that the point M moves toward $M_1$ (FIG. 3). The (virtual) points of rotation of the two swinging half-axles within the vertical vehicle center transverse plane $n$—$n$ are therefore disposed far beyond the vertical vehicle longitudinal center plane $m$—$m$, for example, at $H_1$ and $H_2$ (FIG. 3).

If $a$, $b$, $c$, $d$, $e$ and $g$ are the distances indicated in FIGURE 2, then by reason of the geometric relationship, it may be derived that symmetric movement kinematics of the two swinging half-axles result both with one-sided or unilateral and two-sided as well as with alternate spring action if the following transmission ratios are maintained:

$$\frac{b}{d}=\frac{a}{c}\cdot\frac{s/2}{e}=\frac{s/2+e-g}{s/2+e}$$

For the increase of the swinging length of the two swinging half axles, the following relations may be obtained from FIGURE 3:

$$\frac{s/2+h}{s/2}=\frac{s/2+e}{s/2-e}$$

or $$h=\frac{e\cdot s}{s/2-e}$$

Hence, one obtains the following values:

for $e=s/8$: $h=s/3$ for $e=s/6$: $h=s/2$

In the latter case, the ideal swinging length of each of the two swinging half-axles is already equal to $s/2+s/2$, that is, equal to the wheel track $s$.

While we have shown and described two embodiments in accordance with the present invention, it is understood that the same is not limited thereto, but is susceptible of numerous changes and modifications as known to a person skilled in the art.

For example, instead of by means of an intermediate guide structure 38, the support of the one swinging half-axle on the other swinging half-axle may also take place directly or by the interposition of other suitable appropriate known means. Furthermore, instead of the support of the swinging half-axle 13, by means of a longitudinally directed arm 20, some other arrangement may be provided which absorbs the longitudinal forces and torques or moments, for example, also a second swinging support similar to the support or intermediate guide structure 38.

Of course, the joints of the intermediate or guide structure 38 may also be constructed in a manner different from that illustrated in FIGURE 5. An advantageous construction of the joint consists, for example, in that two rubber rings are provided through which extends an intermediate guide member constructed, for example, in the form of a bolt and by arranging the two rubber rings on both sides of the inclined guide member 26, through which also extends the bolt-like intermediate guide member, and clamping the same from above and/or from below against the intermediate guide member 26 in such a manner that no metallic contact exists between the intermediate guide member and the inclined guide member.

Thus, while we have shown and described two embodiments in accordance with the present invention, it is obvious that the same is not limited thereto, but is susceptible of numerous changes and modifications as known to a person skilled in the art, and we therefore do not wish to be limited to the details shown and described herein, but intend to cover all such changes and modifications as are encompassed by the scope of the appended claims.

We claim:
1. A swinging half-axle arrangement for vehicles, especially motor vehicles, having a vehicle superstructure and an axle gear within an axle gear housing, comprising:
   two swinging half-axle means, one swinging half-axle means for the wheel on each side of the vehicle,
   joint means pivotally and directly connecting said swinging half-axle means with each other within the area of the vertical longitudinal center plane of the vehicle,
   and means for supporting said swinging half-axle means at said vehicle superstructure including guide means pivotally connecting said swinging half-axle means to said vehicle superstructure, means for swingingly connecting one of said swinging half-axle means to said vehicle superstructure on the opposite side of the vehicle longitudinal center plane therefrom in such a manner that the support point of the one swinging half-axle means participates partly in the stroke movements of the other swinging half-axle means and including pivotal link means operatively connected to the guide means swingingly connecting the other swinging half-axle means to the vehicle superstructure, substantially longitudinally extending arm means for connecting said one swinging half-axle means to the vehicle superstructure within the area of said longitudinal center plane about a substantially transverse axis, and substantially transversely extending arm means for supporting said one swinging half-axle means on said pivotal link means, the axle gear housing forming part of said one swinging half-axle means and supporting thereon the longitudinally and transversely extending arm means.

2. A swinging half-axle arrangement for vehicles, especially motor vehicles, having a vehicle superstructure and an axle gear within an axle gear housing, comprising:
   two swinging half-axle means, one swinging half-axle means for the wheel on each side of the vehicle,
   joint means pivotally and directly connecting said swinging half-axle means with each other within the area of the vertical longitudinal center plane of the vehicle,
   and means for supporting said swinging half-axle means at said vehicle superstructure including guide means pivotally connecting said swinging half-axle means to said vehicle superstructure, means for swingingly connecting one of said swinging half-axle means to said vehicle superstructure on the opposite side of the vehicle longitudinal center plane therefrom in such a manner that the support point of the one swinging half-axle means participates partly in the stroke movements of the other swinging half-axle means and including pivotal link means operatively connected to the guide means swingingly connecting the other swinging half-axle means to the vehicle superstructure, substantially longitudinally extending arm means for connecting said one swinging half-axle means to the vehicle superstructure within the area of said longitudinal center plane about a substantially transverse axis, and substantially transversely extending arm means for supporting said one swinging half-axle means on said pivotal link means,
   said swinging half-axle means being formed essentially by the axle drive shafts of the wheels and being operatively connected with each other within the area of the vertical vehicle longitudinal center plane by means of a driving joint, the axle gear housing forming part of said one swinging half-axle means and supporting thereon the longitudinally and transversely extending arm means.

3. A swinging half-axle arrangement for vehicles, especially motor vehicles, having a vehicle superstructure and an axle gear within an axle gear housing, comprising:
   two swinging half-axle means, one swinging half-axle means for the wheel on each side of the vehicle,
   joint means pivotally and directly connecting said swinging half-axle means with each other within the area of the vertical longitudinal center plane of the vehicle,
   and means for supporting said swinging half-axle means at said vehicle superstructure including guide means pivotally connecting said swinging half-axle means to said vehicle superstructure, means for swingingly connecting one of said swinging half-axle means to said vehicle superstructure on the opposite side of the vehicle longitudinal center plane therefrom in such a manner that the support point of the one swinging half-axle means participates partly in the stroke movements of the other swinging half-axle means and including pivotal link means operatively connected to the guide means swingingly connecting the other swinging half-axle means to the vehicle superstructure, substantially longitudinally extending arm means for connecting said one swinging half-axle means to the vehicle superstructure within the area of said longitudinal center plane about a substantially transverse axis, and substantially transversely extending arm means for supporting said one swinging half-axle means on said pivotal link means,
   said swinging half-axle means being formed essentially by the axle drive shafts of the wheels and being operatively connected with each other within the area of the vertical vehicle longitudinal center plane by means of a driving joint, the axle gear housing forming part of said one swinging half-axle means and supporting thereon the longitudinally and transversely extending arm means,
   the support of said one swinging half-axle means being provided at such a point of said pivotal link means that the geometric swinging axes of both swinging half-axle means are disposed symmetrically on both sides of the vertical vehicle longitudinal center plane.

4. A swinging half-axle arrangement for vehicles, especially motor vehicles, having a vehicle superstructure and an axle gear within an axle gear housing, comprising:
   two swinging half-axle means, one swinging half-axle means for the wheel on each side of the vehicle, joint means pivotally and directly connecting said swinging half-axle means with each other within the area of the vertical longitudinal center plane of the vehicle, and means for supporting said swinging half-axle means at said vehicle superstructure including guide means pivotally connecting said swinging half-axle means to said vehicle superstructure, means for swingingly connecting one of said swinging half-axle means to said vehicle superstructure on the opposite side of the vehicle longitudinal center plane therefrom in such a manner that the support point of the one swinging half-axle means participates partly in the stroke movements of the other swinging half-axle means and including pivotal link means operatively connected to the guide means swingingly connecting the other swinging half-axle means to the vehicle superstructure, substantially longitudinally extending arm means for connecting said one swinging half-axle means to the vehicle superstructure within the area of said longitudinal center plane about a substantially transverse axis, and substantially transversely extending arm means for supporting said one swinging half-axle means on said pivotal link means, said swinging half-axle means being formed essentially by the axle drive shafts of the wheels and being operatively connected with each other within the area of the vertical vehicle longitudinal center plane by means of a driving joint, the axle gear housing forming part of said one swinging half-axle means and supporting thereon the longitudinally and transversely extending arm means, the support of said one swinging half-axle means being provided at such a point of said pivotal link means that the geometric swinging axes of both swinging half-axle means are disposed symmetrically on both sides of the vertical vehicle longitudinal center plane, the relationship of the support lever arm $b$ of said one swinging half-axle means directly at the vehicle superstructure, on the one hand, and the support lever arm $d$ thereof on the pivotal link means conforming substantially to the equation of $$\frac{b}{d}=\frac{a}{c}\cdot\frac{s/2}{e}\cdot\frac{s/2+e-g}{s/2+e}$$

where $s$ is the wheel track of the wheels, $a$ is the distance from the vehicle transverse plane extending through the wheel centers to the transverse plane through the transversely extending swinging axis, $c$ is the distance from a plane passing through the pivotal connection of said guide means and said link means at the vehicle superstructure, on the one hand, and the point of pivotal connection between the link means and the other swinging half-axle means, on the other hand, $e$ the transverse distance from the point of pivotal interconnection of the two swinging half-axle means to the intersection with the transverse plane through wheel centers of the axis determined by the line extending through said transverse swinging axis and the pivotal connection of said swinging half-axle means on said link means, and $g$ is the distance in the transverse direction from the longitudinal vertical plane through the pivotal connection between the link means and the other swinging half-axle means, on the one hand, and the longitudinal wheel center plane of the corresponding wheel, on the other.

5. A swinging half-axle arrangement for vehicles, especially motor vehicles, having a vehicle superstructure, comprising:

two swinging half-axle means, one swinging half-axle means for the wheel on each side of the vehicle, means pivotally connecting said swinging half-axle means with each other within the area of the vertical longitudinal center plane of the vehicle, and means for supporting said swinging half-axle means at said vehicle superstructure including guide means pivotally connecting said swinging half-axle means to said vehicle superstructure, means for swingingly connecting one of said swinging half-axle means to said vehicle superstructure on the opposite side of the vehicle longitudinal center plane therefrom in such a manner that the support point of the one swinging half-axle means participates partly in the stroke movements of the other swinging half-axle means and including pivotal link means operatively connected to the guide means swingingly connecting the other swinging half-axle means to the said vehicle superstructure, the support of said one swinging half-axle means being provided at such a point of said pivotal link means that the geometric swinging axes of both swinging half-axle means are disposed symmetrically on both sides of the vertical vehicle longitudinal center plane, the relationship of the support lever arm $b$ of said one swinging half-axle means directly at the vehicle superstructure, on the one hand, and the support lever arm $d$ thereof on the pivotal link means conforming substantially to the equation of $$\frac{b}{d}=\frac{a}{c}\cdot\frac{s/2}{e}\cdot\frac{s/2+e-g}{s/2+e}$$

where $s$ is the wheel track of the wheels, $a$ is the distance from the vehicle transverse plane extending through the wheel centers to the transverse plane through the transversely extending swinging axis, $c$ is the distance from a plane passing through the pivotal connection of said guide means and said link means at the vehicle superstructure, on the one hand, and the point of pivotal connection between the link means and the other swinging half-axle means, on the other hand, $e$ the transverse distance from the point of pivotal interconnection of the two swinging half-axle means to the intersection with the transverse plane through wheel centers of the axis determined by the line extending through said transverse swinging axis and the pivotal connection of said swinging half-axle means on said link means, and $g$ is the distance in the transverse direction from the longitudinal vertical plane through the pivotal connection between the link means and the other swinging half-axle means, on the one hand, and the longitudinal wheel center plane of the corresponding wheel, on the other.

6. A swinging half-axle arrangement for vehicles, especially motor vehicles, having a vehicle superstructure, comprising:

two swinging half-axle means, one swinging half-axle means for the wheel on each side of the vehicle, joint means pivotally and directly connecting said swinging half-axle means with each other within the area of the vertical longitudinal center plane of the vehicle, and means for supporting said swinging half-axle means at said vehicle superstructure including guide means pivotally connecting said swinging half-axle means to said vehicle superstructure, means for swingingly connecting one of said swinging half-axle means to said vehicle superstructure on the opposite side of the vehicle longitudinal center plane therefrom in such a manner that the support point of the one swinging half-axle means participates partly in the stroke movements of the other swinging half-axle means and including pivotal link means operatively connected to the guide means swingingly connecting the other swinging half-axle means to the vehicle superstructure, substantially longitudinally extending arm means for connecting said one swinging half-axle means to the vehicle superstructure within the area of said longitudinal center plane about a substantially transverse axis, and substantially transversely extending arm means for supporting said one swinging half-axle means on said pivotal link means, the longitudinally extending support arm means of the one swinging half-axle means being constructed to be elastic in bending and torsion and the transversely extending support arm means being also constructed to be elastic in bending and torsion.

7. A swinging half-axle arrangement for vehicles, especially motor vehicles, having a vehicle superstructure and an axle gear within an axle gear housing, comprising:

two swinging half-axle means, one swinging half-axle means for the wheel on each side of the vehicle,
joint means pivotally and directly connecting said swinging half-axle means with each other within the area of the vertical longitudinal center plane of the vehicle,
and means for supporting said swinging half-axle means at said vehicle superstructure including guide means pivotally connecting said swinging half-axle means to said vehicle superstructure, means for swingingly connecting one of said swinging half-axle means to said vehicle superstructure on the opposite side of the vehicle longitudinal center plane therefrom in such a manner that the support point of the one swinging half-axle means participates partly in the stroke movements of the other swinging half-axle means and including pivotal link means operatively connected to the guide means swingingly connecting the other swinging half-axle means to the vehicle superstructure, substantially longitudinally extending arm means for connecting said one swinging half-axle means to the vehicle superstructure within the area of said longitudinal center plane about a substantially transverse axis, and substantially transversely extending arm means for supporting said one swinging half-axle means on said pivotal link means,
said swinging half-axle means being formed essentially by the axle drive shafts of the wheels and being operatively connected with each other within the area of the vertical vehicle longitudinal center plane by means of a driving joint, the axle gear housing forming part of said one swinging half-axle means and supporting thereon the longitudinally and transversely extending arm means,
the support of said one swinging half-axle means being provided at such a point of said pivotal link means that the geometric swinging axes of both swinging half-axle means are disposed symmetrically on both sides of the vertical vehicle longitudinal center plane,
the longitudinally extending support arm means of the one swinging half-axle means being constructed to be elastic in bending and torsion in the manner of a leaf spring and the transversely extending support arm means being also constructed to be elastic in bending and torsion by the inclusion of two leaf springs.

8. A swinging half-axle arrangement for vehicles, especially motor vehicles, having a vehicle superstructure, comprising:

two swinging half-axle means, one for the wheel on each side of the vehicle,
means pivotally connecting said swinging half-axle means with each other within the area of the vertical longitudinal center plane of the vehicle,
and means for connecting said swinging half-axle means to said vehicle superstructure including guide means pivotally connecting said swinging half-axle means to said vehicle superstructure, and means for swingingly supporting one of said swinging half-axle means to said vehicle superstructure on the opposite side of the vehicle longitudinal center plane therefrom including link means pivotally connected to the guide means swingingly connecting the other swinging half-axle means to the vehicle superstructure in such a manner that the support point of said one swinging half-axle means participates partly in the stroke movements of said other swinging half-axle means, substantially longitudinally extending arm means for connecting said one swinging half-axle means to the vehicle superstructure within the area of said longitudinal center plane about a vehicle transverse axis, and substantially transversely directed arm means for supporting said one swinging half-axle means on the guide means forming part of said link means.

9. A swinging half-axle arrangement for vehicles, especially motor vehicles, having a vehicle superstructure, comprising:

two swinging half-axle means, one for the wheel on each side of the vehicle,
means pivotally connecting said swinging half-axle means with each other within the area of the vertical longitudinal center plane of the vehicle,
and means for supporting said swinging half-axle means at said vehicle superstructure including guide means pivotally connecting said swinging half-axle means to said vehicle superstructure, and means for swingingly supporting one of said swinging half-axle means to said vehicle superstructure on the opposite side of the vehicle longitudinal center plane therefrom including link means pivotally connected to the guide means swingingly connecting the other swinging half-axle means to the vehicle superstructure in such a manner that the support point of said one swinging half-axle means participates partly in the stroke movements of said other swinging half-axle means, substantially longitudinally extending arm means for supporting said one swinging half-axle means at the vehicle superstrucutre within the area of said longitudinal center plane about a vehicle transverse axis, and substantially transversely directed arm means for supporting said one swinging half-axle means on the guide means forming part of said link means,
said swinging half-axle means being formed essentially by the axle drive shafts of the wheels and being operatively connected within the area of the vertical vehicle longitudinal center plane by means of a driving joint, the axle gear housing forming part of said one swinging half-axle means and supporting thereon at least one of said two support arm means.

10. A swinging half-axle arrangement for vehicles, especially motor vehicles, having a vehicle superstructure, comprising:

two swinging half-axle means, one for the wheel on each side of the vehicle,
means pivotally connecting said swinging half-axle means with each other within the area of the vertical longitudinal center plane of the vehicle,
and means for connecting said swinging half-axle means to said vehicle superstructure including guide means pivotally connecting said swinging half-axle means to said vehicle superstructure, and means for swingingly supporting one of said swinging half-axle means to said vehicle superstructure on the opposite side of the vehicle longitudinal center plane therefrom including link means pivotally connected to the guide means swingingly connecting the other swinging half-axle means to the vehicle superstructure in such a manner that the support point of said one swinging half-axle means participates partly in the stroke movements of said other swinging half-axle means, substantially longitudinally extending arm means for connecting said one swinging half-axle means to the vehicle superstructure within the area of said longitudinal center plane about a vehicle transverse axis, and substantially transversely directed arm means for supporting said one swinging half-axle means on the guide means forming part of said link means, said swinging half-axle means being formed essentially by the axle drive shafts of the wheels and being operatively connected within the area of the vertical vehicle longitudinal center plane by means of a driving joint, the axle gear housing forming part of said one swinging half-axle means and supporting thereon at least one of said two support arm means, the support of said one swinging half-axle means being provided at such a point of the link means that the geometric swinging axes of both swinging half-axle means are disposed symmetrically on both sides of the vertical vehicle longitudinal center plane.

11. A swinging half-axle arrangement for vehicles, especially motor vehicles, having a vehicle superstructure, comprising:

two swinging half-axle means, one for the wheel on each side of the vehicle, means pivotally connecting said swinging half-axle means with each other within the area of the vertical longitudinal center plane of the vehicle, and means for swingingly connecting said swinging half-axle means to said vehicle superstructure including guide means for each swinging half-axle means effectively providing swinging axes, and further means pivotally connecting one swinging half-axle means to said vehicle superstructure on the opposite side of the vehicle longitudinal center plane therefrom in such a manner that the support point of said one swinging half-axle means participates partly in the stroke movements of said other swinging half-axle means, said further means being constituted in part by link means pivotally connecting said one swinging half-axle means to the guide means for said other swinging half-axle means.

12. A swinging half-axle arrangement for vehicles, especially motor vehicles, having a vehicle superstructure, comprising:

two swinging half-axle means, one for the wheel on each side of the vehicle, means pivotally connecting said swinging half-axle means with each other within the area of the vertical longitudinal center plane of the vehicle, means including inclined guide arm means for each swinging half-axle means for swingingly supporting the two swinging half-axle means about inclined swinging axes, and further means for swingingly connecting one of said swinging half-axle means to said vehicle superstructure on the opposite side of the vehicle longitudinal center plane in such a manner that the support point of said one swinging half-axle means at the other swinging half-axle means participates partly in the stroke movements of said other swinging half-axle means including link means pivotally connected to the inclined guide arm means which swingingly connect the said other swinging half-axle means to the superstructure and a substantially upright intermediate guide member operatively connecting said one swinging half-axle means with the inclined guide arm means of said linkage means.

13. A swinging half-axle arrangement for vehicles, especially motor vehicles, having a vehicle superstructure, comprising:

two swinging half-axle means, one for the wheel on each side of the vehicle, means pivotally connecting said swinging half-axle means with each other within the area of the vertical longitudinal center plane of the vehicle, means including inclined guide arm means for each swinging half-axle means for swingingly supporting the two swinging half-axle means about inclined swinging axes, and further means for swingingly connecting one of said swinging half-axle means to said vehicle superstructure on the opposite side of the vehicle longitudinal center plane in such a manner that the support point of said one swinging half-axle means at the other swinging half-axle means participates partly in the stroke movements of said other swinging half-axle means including link means pivotally connected to the inclined guide arm means which swingingly support the said other swinging half-axle means at the superstructure and a substantially upright intermediate guide member operatively connecting said one swinging half-axle means with the inclined guide arm means of said linkage means.

each of said inclined guide arm means including a rigid guide arm obliquely directed to the vehicle driving direction and pivotally connected with the respective swinging half-axle means about a substantially longitudinal axis and a leaf spring-like guide arm operatively connected with said rigid guide arm.

14. A swinging half-axle arrangement for vehicles, especially motor vehicles, having a vehicle superstructure, comprising:

two swinging half-axle means, one for the wheel on each side of the vehicle, means pivotally connecting said swinging half-axle means with each other within the area of the vertical longitudinal center plane of the vehicle, and means for swingingly connecting said swinging half-axle means to said vehicle superstructure including obliquely extending guide arm means for each swinging half-axle means effectively providing obliquely extending swinging axes, and further means pivotally connecting one swinging half-axle means to said vehicle superstructure on the opposite side of the vehicle longitudinal center plane in such a manner that the support point of said one swinging half-axle means participates partly in the stroke movements of said other swinging half-axle means, said further means being constituted in part by link means pivotally connecting said one swinging half-axle means to the guide means for said other swinging half-axle means.

15. A swinging half-axle arrangement for vehicles, especially motor vehicles, having a vehicle superstructure, comprising:

two swinging half-axle means, one for the wheel on each side of the vehicle, means pivotally connecting said swinging half-axle means with each other within the area of the vertical longitudinal center plane of the vehicle, means including inclined guide arm means for each swinging half-axle means for swingingly supporting the two swinging half-axle means about inclined swinging axes, and further means for swingingly connecting one of said swinging half-axle means to said vehicle superstructure on the opposite side of the vehicle longitudinal center plane in such a manner that the support point of said one swinging half-axle means at the other swinging half-axle means participates partly in the stroke movements of said other swinging half-axle means including link means pivotally connected to the inclined guide arm means which swingingly connect the said other swinging half-axle means to the superstructure and a substantially upright intermediate guide member operatively connecting said one swinging half-axle means with the inclined guide arm means of said linkage means, said further means including substantially longitudinally extending support arm means for supporting said one swinging half-axle means at the vehicle superstructure within the area of said longitudinal center plane about a vehicle transverse axis, and substantially transversely directed support arm means for supporting said one swinging half-axle means on said linkage means by way of said intermediate guide member, said inclined guide arm means as well as said support arm means of said one swinging half-axle means and of the intermediate guide member being pivotally connected by the interposition of elastic means.

16. A swinging half-axle arrangement for vehicles, especially motor vehicles, having a vehicle superstructure, comprising:

two swinging half-axle means, one for the wheel on each side of the vehicle, means pivotally connecting said swinging half-axle means with each other within the area of the vertical longitudinal center plane of the vehicle, and means for swingingly connecting said swinging half-axle means to said vehicle superstructure including guide means for each swinging half-axle means effectively providing swinging axes, and further means pivotally connecting one swinging half-axle means to said vehicle superstructure on the opposite side of the vehicle longitudinal center plane therefrom in such a manner that the support point of said one swinging half-axle means participates partly in the stroke movements of said other swinging half-axle means, said further means being constituted in part by link means pivotally connecting said one swinging half-axle means to the guide means for said swinging half-axle means, the support of said one swinging half-axle means being provided at such a point of the link means that the geometric swinging axes of both swinging half-axle means are disposed symmetrically on both sides of the vertical vehicle longitudinal center plane.

17. A swinging half-axle arrangement for vehicles, especially motor vehicles, having a vehicle superstructure, comprising:

two swinging half-axle means, one for the wheel on each side of the vehicle, means pivotally connecting said swinging half-axle means with each other within the area of the vertical longitudinal center plane of the vehicle, means including inclined guide arm means for each swinging half-axle means for swingingly supporting the two swinging half-axle means about inclined swinging axes, and further means for swingingly connecting one of said swinging half-axle means to said vehicle superstructure on the opposite side of the vehicle longitudinal center plane in such a manner that the support point of said one swinging half-axle means at the other swinging half-axle means participates partly in the stroke movements of said other swinging half-axle means including link means pivotally connected to the inclined guide arm means which swingingly connect the said other swinging half-axle means to the superstructure and a substantially upright intermediate guide member operatively connecting said one swinging half-axle means with the inclined guide arm means of said linkage means, said further means including substantially longitudinally extending support arm means for connecting said one swinging half-axle means to the vehicle superstructure within the area of said longitudinal center plane about a vehicle transverse axis, and substantially transversely directed support arm means for supporting said one swinging half-axle means on said linkage means by way of said intermediate guide member, the longitudinally directed support arm means of the one swinging half-axle means being constructed elastically with respect to bending and torsion and the transversely directed support arm means being also constructed elastically with respect to bending and torsion, each of said inclined guide arm means including a rigid guide arm obliquely directed to the vehicle driving direction and pivotally connected with the respective swinging half-axle means about a substantially longitudinal axis and a leaf spring-like guide arm operatively connected with said rigid guide arm, said inclined guide arm means as well as said support arm means of said one swinging half-axle means and of the intermediate guide member being pivotally connected by the interposition of elastic means.

18. A swinging half-axle arrangement for vehicles, especially motor vehicles, having a vehicle superstructure, comprising:

two swinging half-axle means, one for the wheel on each side of the vehicle, means pivotally connecting said swinging half-axle means with each other within the area of the vertical longitudinal center plane of the vehicle, and means for swingingly connecting said swinging half-axle means to said vehicle superstructure including obliquely extending guide arm means for each swinging half-axle means effectively providing obliquely extending swinging axes, and further means pivotally supporting one swinging half-axle means at said vehicle superstructure on the opposite side of the vehicle longitudinal center plane in such a manner that the support point of said one swinging half-axle means participates partly in the stroke movements of said other swinging half-axle means, said further means being constituted in part by link means pivotally connecting said one swinging half-axle means to the guide means for said other swinging half-axle means and including substantially longitudinally extending support arm means for connecting said one swinging half-axle means to the vehicle superstructure within the area of said longitudinal center plane about a substantially transverse axis, and substantially transversely directed arm means for supporting said one swinging half-axle means on said link means.

19. A swinging half-axle arrangement for vehicles, especially motor vehicles, having a vehicle superstructure, comprising:

two swinging half-axle means, one for the wheel on each side of the vehicle, means pivotally connecting said swinging half-axle means with each other within the area of the vertical longitudinal center plane of the vehicle, means including inclined guide arm means for each swinging half-axle means for swingingly supporting the two swinging half-axle means about inclined swinging axes, and further means for swingingly connecting one of said swinging half-axle means to said vehicle superstructure on the opposite side of the vehicle longitudinal center plane in such a manner that the support point of said one swinging half-axle means at the other swinging half-axle means participates partly in the stroke movements of said other swinging half-axle means including link means pivotally connected to the inclined guide arm means which swingingly connect the said other swinging half-axle means to the superstructure and a substantially upright intermediate guide member operatively connecting said one swinging half-axle means with the inclined guide arm means of said linkage means, said further means including substantially longitudinally extending support arm means for connecting said one swinging half-axle means to the vehicle superstructure within the area of said longitudinal center plane about a vehicle transverse axis, and substantially transversely directed support arm means for supporting said one swinging half-axle means on said linkage means by way of said intermediate guide member, said swinging half-axle means being formed essentially by the axle drive shafts of the wheels, and being operatively connected within the area of the vertical vehicle longitudinal center plane by a driving joint, an axle gear housing forming part of said one swinging half-axle means and supporting thereon at least one of said two arm means, the support of said first-mentioned one swinging half-axle means being provided at such a point of the linkage means that the geometric swinging axes of both swinging half-axle means are disposed symmetrically on both sides of the vertical vehicle longitudinal center plane, the longitudinally directed support arm means of the one swinging half-axle means being constructed elastically with respect to bending and torsion and the transversely directed support arm means being also constructed elastically with respect to bending and torsion, each of said inclined guide arm means including a rigid guide arm obliquely directed to the vehicle driving direction and pivotally connected with the respective swinging half-axle means about a substantially longitudinal axis and a leaf spring-like guide arm operatively connected with said rigid guide arm, said inclined guide arm means as well as said support arm means of said one swinging half-axle means and of the intermediate guide member being pivotally connected by the interposition of elastic means.

References Cited by the Examiner

UNITED STATES PATENTS

| | | | |
|---|---|---|---|
| 2,055,975 | 9/1936 | Haltenberger | 180—73 |
| 2,942,893 | 6/1960 | Nallinger | 280—124 |
| 2,983,328 | 5/1961 | Ewart | 180—73 |

FOREIGN PATENTS

| | | |
|---|---|---|
| 62,466 | 1/1955 | France. |
| | | (2nd edition to 1,046,266) |
| 893,409 | 4/1962 | Great Britain. |

BENJAMIN HERSH, *Primary Examiner.*